UNITED STATES PATENT OFFICE.

CHARLES A. BROWNE AND ISAAC S. BROWNE, OF NORTH ADAMS, MASS.

IMPROVEMENT IN EXPLOSIVE COMPOUNDS.

Specification forming part of Letters Patent No. 152,790, dated July 7, 1874; application filed May 1, 1874.

*To all whom it may concern:*

Be it known that we, CHARLES A. BROWNE and ISAAC S. BROWNE, of North Adams, Berkshire county, Massachusetts, have invented a new and Improved Explosive Compound for Priming Electric Fuses, &c., of which the following is a specification:

Our invention relates to a new priming compound, which is exploded by a current of electricity, or the electric spark, when properly secured in an interruption of the electric circuit, so that a safe, certain, and economical method of exploding charges by electricity is secured. The use of the priming compound admits, also, in most cases, of the substitution of less expensive insulated wires for the more expensive gutta-percha or rubber insulators, excepting for submarine or very wet workings, where the common cotton insulation would be hardly sufficient. Our priming compound consists of the mixture of fulminate of mercury with pulverized antimony in various proportions, with an addition of antimonic sulphide or other ingredients, if desired, for producing a greater or less degree of electric conductivity of the priming.

We have found, after repeated experiments, that the following formula is best adapted to static electricity: Fulminate of mercury, four parts; antimony, three parts; antimonic sulphide, one part. This mixture has been found to give the most satisfactory results in not being too easily exploded by weaker currents of electricity, nor requiring a battery of too great power to effect its explosion. It is prepared in the following manner: A small quantity of fulminate, having been dried by a gentle heat, (not above 212° Fahrenheit,) is passed through a fine sieve. The other ingredients, having been thoroughly pulverized, are also sifted in like manner. The several ingredients are then weighed and thoroughly mixed by passing them several times through a coarser sieve than the one first used. Great care should be used in selecting the ingredients in as nearly a chemically pure state as possible.

The success of the compound is based upon the peculiar property of the antimony, when pure or mixed with other ingredients, of being heated by the passage of electricity to a sufficient degree to explode the fulminate with which it is in contact. By the finely-divided pure metal a high degree of conductivity is imparted to the compound, and therefore the use of cheap insulators admissible.

Different degrees of sensitiveness may be produced by changing the proportions, thus adapting it to electricity of varying tension. By increasing the quantity of antimony it becomes more conductive, and consequently more sensitive to electricity of low tension. By decreasing the quantity of antimony the opposite results are obtained. Inert matter—as pulverized coke, oxide of iron, plumbago, &c.—may be introduced to a certain extent by substituting them, in whole or part, for the antimony, or for the sulphide of antimony.

The same changes and modifications may be successfully produced by varying the proportion of the ingredients specified in our mode of preparation without the admixture of extra ingredients.

Great care should be exercised in preparing the compound, as it is otherwise attended with danger to the manipulator.

The priming is applied in the usual manner to the fuse in the electric circuit, and thereby the explosion of the fulminate and charge rendered almost absolutely certain and reliable.

Having thus described our invention, we claim as new, and desire to secure by Letters Patent—

A compound adapted to be exploded by electricity, consisting of fulminate of mercury, antimony, and sulphide of antimony, prepared and applied in the manner set forth.

CHAS. A. BROWNE.
ISAAC S. BROWNE.

Witnesses:
GEO. L. RICE,
IRVING A. DARLING.